(12) United States Patent
Bekkerman et al.

(10) Patent No.: US 8,463,784 B1
(45) Date of Patent: Jun. 11, 2013

(54) IMPROVING DATA CLUSTERING STABILITY

(75) Inventors: Ron Bekkerman, Palo Alto, CA (US); Martin B. Scholz, San Francisco, CA (US); Krishnamurthy Viswanathan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 12/537,614

(22) Filed: Aug. 7, 2009

(51) Int. Cl.
*G06F 17/30* (2006.01)
(52) U.S. Cl.
USPC .......................................................... 707/737
(58) Field of Classification Search
USPC .......................................................... 707/737
See application file for complete search history.

(56) References Cited

U.S. PATENT DOCUMENTS

| | | | |
|---|---|---|---|
| 6,839,680 B1 | 1/2005 | Liu et al. | |
| 2002/0161763 A1* | 10/2002 | Ye et al. | 707/7 |
| 2003/0101449 A1 | 5/2003 | Bentolila et al. | |
| 2008/0126176 A1 | 5/2008 | Iguchi | |
| 2008/0162533 A1* | 7/2008 | Mount et al. | 707/102 |

OTHER PUBLICATIONS

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/ 2010.
Hottolink Inc.; "Recognize" Online, http://www.hottolink.co.jp/english/reconize.html, 2009.
Andrejko et al.: "User Characteristics Acquisition from Logs with Semantics" 8. Slovak University of Technology in Bratislava, 2007.
Hongjun Lu et al: Extending a Web Browser with Client-Side Mining, Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , 2008.
Shahabi et al.; "Yoda An Accurate and Scalable Web based Recommendation System?" University of Southern California, Los Angeles, Sep. 2001.
Why Wubat? Website User Behavior & Analysis Tool, Wubat, Online, http://www.wubat.com/, 2010.
Claypool et al.; "Implicit Interest Indicators", 14. Worcester Polytechnic Institute, Worcester, Computer Science Department Worcester Polytechnic Institute Worcester, MA 01609, USA., 2001.

(Continued)

*Primary Examiner* — Rehana Perveen
*Assistant Examiner* — Alexander Khong

(57) ABSTRACT

Improving data clustering stability. A computer accesses a first plurality of cluster groups comprising data. The computer then applies a clustering method to the first plurality of cluster groups while adjusting said first plurality of cluster groups to be in higher agreement between themselves, thereby generating a second plurality of cluster groups that is in higher agreement between themselves than the first plurality of cluster groups. The second plurality of cluster groups corresponds to the first plurality of cluster groups.

16 Claims, 5 Drawing Sheets

OTHER PUBLICATIONS

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

400

```
┌─────────────────────────────────────────────────────┐
│ Applies by a computer a plurality of clustering     │
│ methods to a set of data to generate a first        │
│ plurality of cluster groups, wherein the plurality  │
│ of clustering methods applied to the set of data is │
│ selected from a group of clustering methods         │
│ consisting of: spectral clustering; partitional     │
│ clustering; and maximum margin clustering.          │
│ 405                                                 │
└─────────────────────────────────────────────────────┘
                          │
                          ▼
┌─────────────────────────────────────────────────────┐
│ Accesses by the computer a first plurality of       │
│ cluster groups comprising data.                     │
│ 410                                                 │
└─────────────────────────────────────────────────────┘
                          │
                          ▼
┌─────────────────────────────────────────────────────┐
│ Applies by the computer a clustering method to the  │
│ first plurality of cluster groups while adjusts the │
│ first plurality of cluster groups to be in higher   │
│ agreement between themselves, thereby generating    │
│ a second plurality of cluster groups in higher      │
│ agreement between themselves than the first         │
│ plurality of cluster groups, wherein the second     │
│ plurality of cluster groups corresponds to the      │
│ first plurality of cluster groups.                  │
│ 415                                                 │
└─────────────────────────────────────────────────────┘
                          │
                          ▼
┌─────────────────────────────────────────────────────┐
│ Applies by the computer a consensus clustering      │
│ mechanism to the second plurality of cluster        │
│ groups, thereby generating a stable clustering.     │
│ 420                                                 │
│ ┌─────────────────────────────────────────────────┐ │
│ │ Averages the second plurality of cluster groups.│ │
│ │ 425                                             │ │
│ └─────────────────────────────────────────────────┘ │
└─────────────────────────────────────────────────────┘
                          │
                          ▼
┌─────────────────────────────────────────────────────┐
│ Repeats by the computer the applying by the         │
│ computer of a clustering method to the first        │
│ plurality of cluster groups while adjusting the     │
│ first plurality of cluster groups to be in higher   │
│ agreement until the second plurality of cluster     │
│ groups are in higher agreement between themselves.  │
│ 430                                                 │
└─────────────────────────────────────────────────────┘
```

FIG. 4

IMPROVING DATA CLUSTERING STABILITY

BACKGROUND

Computers are widely used today to perform a variety of functions. For example, computers are able to perform data clustering. In general, thousands of data clustering techniques have been proposed over the last 40 years.

Data clustering is a method used for data analysis. It is used in many different fields, such as machine learning, data mining, pattern recognition, image analysis and bioinformatics. Data clustering includes the partitioning of a data set into subsets, such as clusters. The data in each subset usually share some common characteristics, such as the similarity or proximity for some defined distance measured. However, there exist many limitations to conventional data clustering techniques.

BRIEF DESCRIPTION OF THE DRAWINGS

The accompanying drawings, which are incorporated in and form a part of this specification, illustrate embodiments of the present technology for clustering data, together with the description, serve to explain principles discussed below:

FIG. 4 is a flowchart of an example method for clustering data, in accordance with embodiments of the present technology.

Figure 1:
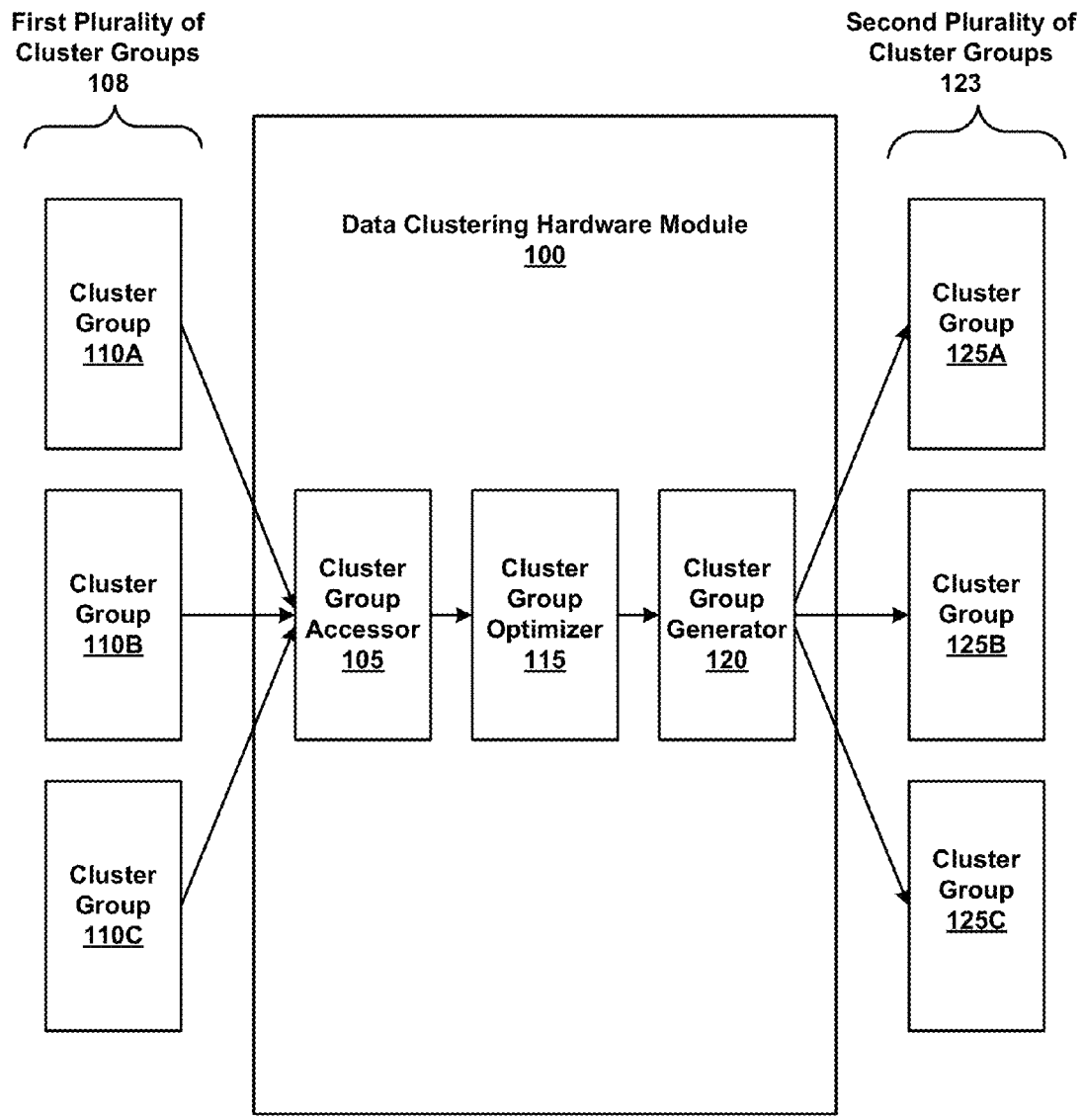
FIG. 1 is a block diagram of an example data clustering hardware module, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "applying", "adjusting", "repeating", "averaging", "conditioning", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers. It should be appreciated that in one embodiment, the present technology may be hardware and firmware, while in another embodiment, the present technology may be hardware and software.

Overview

In regards to data clustering methods, there exists a certain frustration among machine learning practitioners, who cannot choose a data clustering method to work with and who distrust data clustering approaches in general. This common frustration comes from the fact that it is usually difficult (or even impossible) to assess the quality of a data clustering result over large-scale real-world data. Due to this difficulty, the machine learning practitioner is left to believe that a particular clustering method will do a good job on a particular dataset. However, this assumption can prove to be wrong and may lead to unusable results.

Embodiments in accordance with the present technology pertain to a data clustering hardware module for improving data clustering stability. In general, embodiments of the present technology take m clusterings as input and then output m clusterings of comparable quality, which are in higher agreement between themselves. The data clustering hardware module thereby improves clustering stability and accuracy. Additionally, embodiments of the present technology significantly improve stability of consensus clustering built on top of the outputs of m clusterings of comparable quality.

More particularly and in brief, embodiments of the present technology access a first plurality of cluster groups, wherein the cluster groups comprise data. Of note, a plurality of clustering methods has already been applied to a dataset, rendering the first plurality of cluster groups. It should be understood that there are many clustering methods which are well known in the art. Further, the general method of applying a clustering method to a dataset is also well known in the art.

Then, cluster groups of the first plurality of cluster groups are conditioned upon each other. For example, a clustering method is applied to each cluster group of the first plurality of cluster groups while also adjusting the first plurality of cluster groups to be in higher agreement between themselves. Of note, the phrase or similar phrase, "a clustering method is applied to each cluster group of the first plurality of cluster groups" is an alternative expression for applying a clustering method to underlying data, while the clustering method is initialized with the cluster group.

In the context of embodiments of the present technology, the phrase, "in higher agreement between themselves" refers to being "more similar to each other". The cluster groups of the first plurality of cluster groups become "more similar to each other" in terms of set similarity, as measured by, for example, the Jaccard index and/or the Rand index. It should be understood that the Jaccard index and the Rand index are indexes that are well known in the art. It should be understood to those skilled in the art that techniques other than the Jaccard index and the Rand index may be used to measure the similarity between cluster groups of a plurality of cluster groups. A second plurality of cluster groups is then generated.

The second plurality of cluster groups is in higher agreement between themselves than the first plurality of cluster groups.

The conditioning aspect of the present embodiment may be repeated until each cluster group is in higher agreement between themselves and thus of higher quality. This conditioning aspect continues until a pre-determined threshold is reached. For example, the conditioning aspect may be repeated for a pre-determined number of times. In another embodiment, the conditioning aspect may be repeated until cluster groups of the first plurality of cluster groups reach a level of similarity between themselves, as measured, for example, by the Jaccard index.

A consensus clustering mechanism is then applied to the conditioned and improved cluster groups to generate a single stable clustering. In the context of embodiments of the present technology, the phrase, "to generate a single stable clustering" refers to the method that built the "single stable clustering" being more stable. Stability of a method means that it produces similar results while being applied in similar setups. For example, if the clustering method has an input parameter, and the clustering method is applied twice with different but close values of the parameter, the results should appear to be close to each other.

Thus, embodiments of the present technology enable the generation of more stable and accurate data clustering.

Example Architecture of Data Clustering Hardware Module

Figure 2:
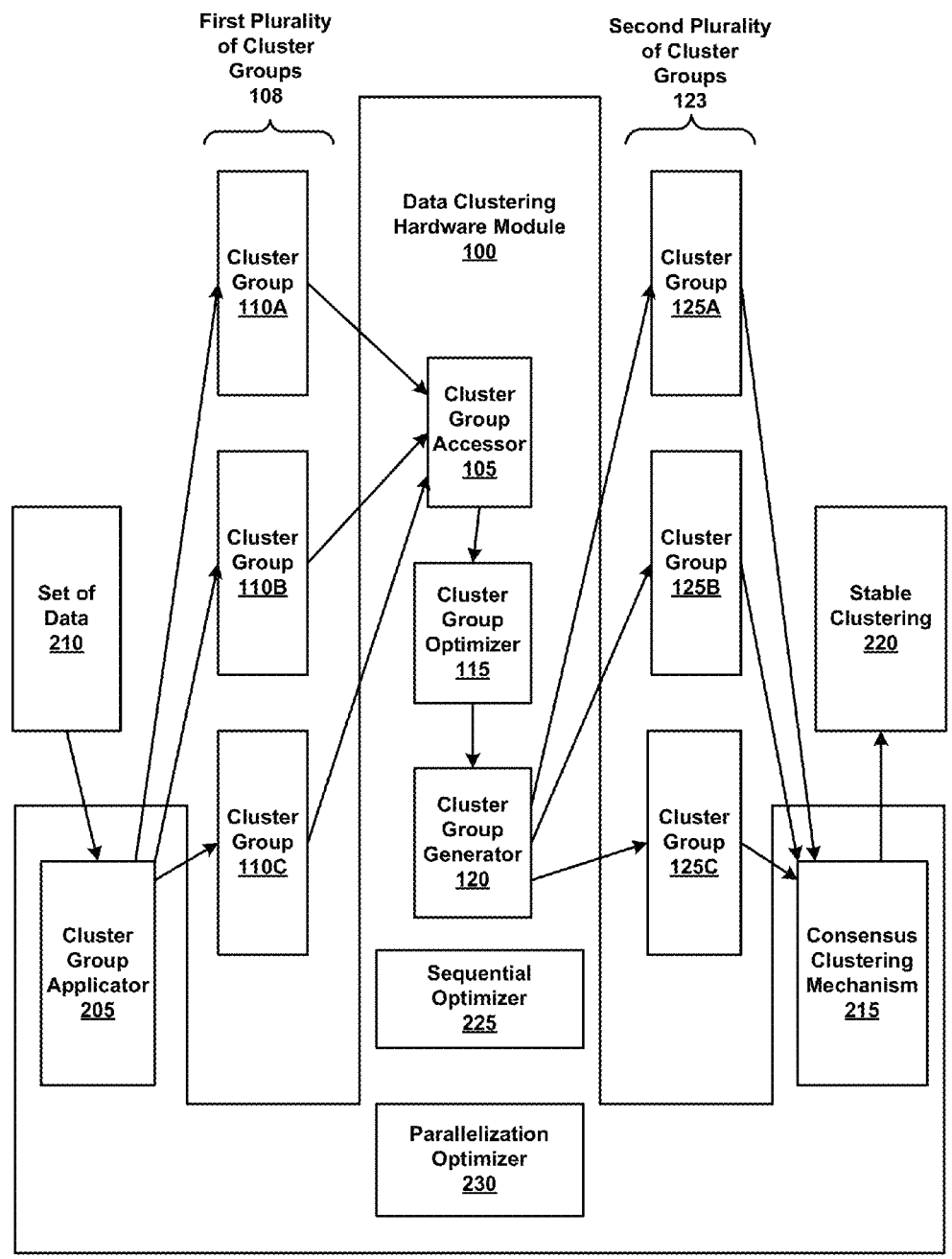
FIG. 2 is a block diagram of an example data clustering hardware module, in accordance with embodiments of the present technology.

FIG. 1 is a block diagram of an example data clustering hardware module (DCHM) 100, in accordance with embodiments of the present technology. DCHM 100 includes a cluster group accessor 105, cluster group optimizer 115 and cluster group generator 120. Referring to FIG. 2, a block diagram of an example data clustering hardware module (DCHM) 100 is shown, in accordance with embodiments of the present technology. In further embodiments, DCHM 100 includes cluster group applicator 205, consensus clustering mechanism 215, sequential optimizer 225 and parallelization optimizer 230.

FIG. 1 shows cluster group accessor 105 accessing a first plurality of cluster groups 108. For purposes of illustration, as well as brevity and clarity, only cluster groups 110A, 110B and 110C (hereinafter, "cluster groups 110A-110C") are shown in FIG. 1. However, it is appreciated that cluster group accessor 105 may access more or less cluster groups and sets of instructions than cluster groups 110A-110C FIG. 1 also shows cluster group generator 120 generating a second plurality of cluster groups 123 corresponding to the first plurality of cluster groups 108. For purposes of illustration, as well as brevity and clarity, only cluster groups 125A, 125B and 125C (hereinafter, "cluster groups 125A-125C") are shown in FIG. 1. However, it is appreciated that cluster group generator 120 may generate more or less cluster groups and sets of instructions than cluster groups 125A-125C.

The term "corresponding" in the context used herein refers to, for example, cluster group 125A being an improved cluster group of cluster group 110A. Similarly, cluster group 125B is an improved cluster group of cluster group 110B. Moreover, cluster group 125C is an improved cluster group of cluster group 110C.

FIG. 2 shows cluster group applicator 205 accessing a set of data 210 and generating the cluster groups 110A-110C of first plurality of cluster groups 108. Additionally, FIG. 2 also shows consensus clustering mechanism 215 accessing cluster groups 125A-125C of second plurality of cluster groups 123 and generating a stable clustering 220.

Example Operation of a Data Clustering Hardware Module

More generally, in embodiments in accordance with the present technology, DCHM 100 is utilized to generate cluster groups that are similar to each other.

Referring to FIG. 1, in one embodiment, cluster group accessor 105 accesses a first plurality of cluster groups 108 that comprise data. Referring still to FIG. 1, in one embodiment, the cluster group optimizer 115 then applies a clustering method to the first plurality of cluster groups 108 (cluster groups 110A-110C) while adjusting the first plurality of cluster groups 108 (cluster groups 110A-110C) to be in higher agreement between themselves.

Referring still to FIG. 1, cluster group generator 120 generates a second plurality of cluster groups 123 that is in higher agreement between themselves than the first plurality of cluster groups 108.

In one embodiment, the values of the second plurality of cluster groups 123 (cluster groups 125A-125B) may then be fixed, such that the second plurality of cluster groups 123 (cluster groups 125A-125C) may be accessed by cluster group accessor 105, and a clustering method may be applied to the second plurality of cluster groups 123 (cluster groups 125A-125C) while being adjusted to be in higher agreement between themselves. In one embodiment, this method of accessing and applying while adjusting occurs repeatedly until the second plurality of cluster groups 123 (cluster group 125A-125C) are in higher agreement between themselves such that a certain threshold is reached or overcome.

In one embodiment, the adjusting of cluster groups 110A-110C of the first plurality of cluster groups 108 occurs sequentially, an example of which will be explained below. In another embodiment, the adjusting of cluster groups 110A-110C of the first plurality of cluster groups 108 occurs in parallel, an example of which will also be explained below.

In one embodiment, and referring now to FIG. 2, a clustering method applicator 205 applies a plurality of clustering methods to a set of data 210 to generate the first plurality of cluster groups 108, before the cluster group accessor 105 accesses the first plurality of cluster groups 108. In one embodiment, the plurality of clustering methods applied to a set of data 210 is selected from a group of clustering methods consisting of: spectral clustering; partitional clustering; maximum margin clustering, and information-theoretic clustering. It should be understood that the plurality of clustering method applied to set of data 210 is not limited to spectral clustering, partitional clustering, maximum margin clustering, and information-theoretic clustering. Any number of other clustering methods may be applied to the set of data 210, including or excluding any one or all of the clustering methods of spectral clustering, partitional clustering, maximum margin clustering and information-theoretic clustering.

In yet another embodiment and after cluster group optimizer 115 adjusts each cluster group of the first plurality of cluster groups 108 to be in higher agreement between themselves, a consensus clustering mechanism 215 applies a consensus clustering method to cluster groups 125A-125C of the second plurality of cluster groups 123 that are in higher agreement between themselves, thereby generating a stable clustering 220. In one embodiment, the consensus clustering mechanism 215 averages the cluster groups 125A-125C of the second plurality of cluster groups 123.

Figure 3:
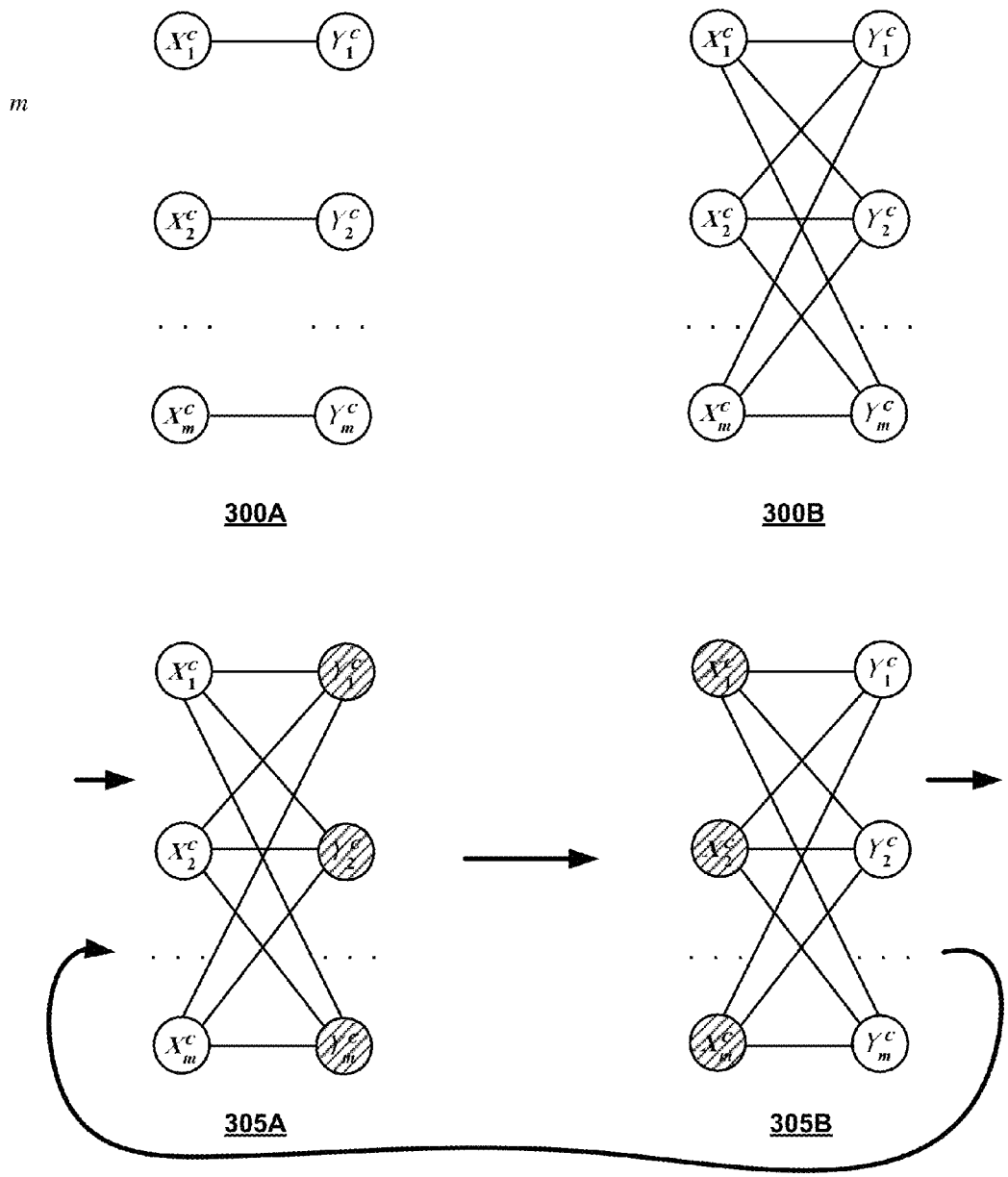
FIG. 3 is a block diagram of a Comraf model used for original clustering, and bipartite Comraf models depicting a method for clustering data, in accordance with embodiments of the present technology.

Referring now to FIG. 3, one implementation of the present technology that is in no way exclusive of other implementations is shown. FIG. 3, a block diagram of a Comraf model 300A used for original clustering and bipartite Comraf models 300B, 305A and 305B depicting a method for clustering data is shown, in accordance with embodiments of the present technology. In one embodiment, the implementation shown in FIG. 3 is performed by DCHM 100 of FIG. 1.

The term, "Comraf", stands for Combinatorial Markov Random Fields, a type of undirected graphical models, and is explained in brief directly below. The Comraf model is grounded on three principals. First, the Comraf model allows a number of data modalities to be clustered simultaneously. For example, consider a data set of documents that should be clustered by topic. A different modality of this data set would be a set of words that are contained in the documents. Other modalities would be a set of authors' names, a set of documents' titles, etc. While simultaneously clustering a number of data modalities, each data modality potentially improves the quality of all the other data modalities. Secondly, the Comraf model optimizes a global objective function over the entire data instead of explicitly defining a pairwise distance measure between data instances. Thirdly, the Comraf model combines several approaches (starting with small clusters and merging them to compose larger clusters [agglomerative], starting with one large cluster and splitting it to obtain smaller clusters [divisive] and starting with k clusters and rearranging data within these clusters [flat, such as k-means]) while choosing the most appropriate approach for each data.

The implementation presented below involves a co-clustering approach, when data instance are clustered simultaneously with their features. For example, in FIG. 3, the X nodes represent data instances, while the Y nodes represent their features. For example, the X nodes may represent documents while the Y nodes may represent words of the documents.

Referring now to 300A of FIG. 3, in an original method for clustering, the resulting model starts with some initial values $x_0^c$ and $y_0^c$ of $X^c$ and $Y^c$, respectively. First, $y_0^c$ is fixed and a local search is performed around $x_0^c$ that aims at maximizing the objective.

In this instance, the specific local search procedure that is used is "hill climbing", performed by moving a data instance x from its current cluster to another for which the objective is maximal (or keeping x in its current cluster in case of having no better option). After some while (e.g. when the objective reaches it plateau, or when all the data instances have been tested, etc.), the new clustering $x_1^c$ is fixed and then $Y^c$ is optimized. The other variables are then addressed in this manner in a round robin fashion. The requirement of the number of clusters k to be fixed during the optimization process does not hold at the transition stage (when there is a switch between $X^c$ and $Y^c$). At that stage, splitting or merging clusters may occur. After T such iterations, clustering $x_T^c$ and $y_T^c$ come to an agreement with each other. m models are built in this manner.

Referring now to 300B of FIG. 3, a bipartite Comraf model built upon the original model 300A is shown in accordance with embodiments of the present technology. The original bi-modal clustering algorithm is randomized; each of its run is likely to produce a different result that captures different signals. This randomization can come from the clustering initialization, as well as from ordering the data instances to test for a potential relocation.

The best from each of the constructed models may be taken by letting them be similar to each other. To initiate such an agreement process, all the $Y_j^c|_{j=1}^m$ nodes are connected, which results in a bipartite graph. Over each edge $e_{ij}$ of the resulting Comraf model, a Mutual Information log-potential $f_{ij}(x_i^c, y_j^c) = I(\tilde{X}_i; \tilde{Y}_j)$ is defined. The new MPE inference process is then derived from the following Equation (1):

$$(x_*^c, y_*^c) = \operatorname*{argmax}_{x^c, y^c} \sum_{e_{ij} \in \mathcal{E}} f_{ij}(x_i^c, y_j^c) = \operatorname*{argmax}_{x^c, y^c} \sum_{i=1}^{m} \sum_{j=1}^{m} I(\tilde{X}_i; \tilde{Y}_j).$$

To perform this optimization, the Iterative Conditional Mode (ICM) inference algorithm is applied. At each iteration of the ICM algorithm, one random variable from the MRF gets chosen, and the values of all the rest of the model get fixed. Next, the chosen variable is optimized with respect to the fixed values of its neighboring random variables. After this optimization step is over, the final value of the chosen variable is fixed, and another variable is then optimized. This continues to occur in a round robin manner. When only one variable gets optimized at a time, the objective from Equation 1 above becomes linear in m.

However, suppose that variable is optimized, as shown in Equation 2 as follows:

$$(x_i^c)_* = \operatorname*{argmax}_{x_i^c} \sum_{i=1}^{m} \sum_{j=1}^{m} I(\tilde{X}_i; \tilde{Y}_j) = \operatorname*{argmax}_{x_i^c} \sum_{j=1}^{m} I(\tilde{X}_i; \tilde{Y}_j).$$

Rather than optimizing one variable at a time, in one embodiment of the present technology, parallelization may be employed. Referring now to 305A and 305B of FIG. 3, if all the values of the $Y_j^c|_{j=1}^m$ variables (indicated with diagonal lines that "shade" nodes in 305A) in the bipartite Comraf model are fixed, then all the $X_j^c|_{i=1}^m$ variables become conditionally independent such that these variables may be optimized in parallel. Once new values of the $X_i^c$ variables are obtained, these values are fixed (indicated with diagonal lines that "shade" nodes in 305B) and then the $Y_j^c$ variables are optimized, in parallel again. This process may be performed until its convergence. During sequential optimization, a first clustering group is optimized while a second clustering group is being conditioned. Then, in sequence, the second clustering group is optimized while the first clustering group is being conditioned. Again and of significance, the implementation described herein is just one implementation example and the embodiments in accordance with the present technology are not limited to this implementation.

In another example of an application of the method for clustering data in accordance with embodiments of the present technology and referring to 300A and 300B of FIG. 3, each pair of nodes, $X_1^c$ coupled with $Y_1^c$, $X_2^c$ coupled with $Y_2^c$, etc. represents a cluster group. The node $X_1^c$ corresponds to one clustering, while the node $X_2^c$ corresponds to another clustering. Both $X_1^c$ and $X_2^c$ may contain a cluster about sports, but the sports cluster of $X_1^c$ may be significantly different from the sports cluster of $X_2^c$. The goal of embodiments of the present technology is to make these sports clusters $X_1^c$ and $X_2^c$ look more similar to each other. This is accomplished by moving unrelated data instances out of each sports cluster $X_1^c$ and $X_2^c$, and relocating related data instances into them.

For example, and referring to FIGS. 1, 2 and 3, suppose that a cluster (for example, node $X_1^c$) of cluster group 110A of a first plurality of cluster groups 108 contains a cluster that has data relating to sports; more particularly, baseball, football, hockey and soccer. However, a cluster group 110B of the first plurality of cluster groups 108 contains a cluster (for example, node $X_2^c$) that has data relating to not only baseball, football, hockey and soccer, but also to Ralph Nader. Embodiments of the present technology adjust cluster group 110B to be in higher agreement with cluster group 110A. For example, the data relating to Ralph Nader may be moved to a cluster within that same cluster group 110B that contains data relating to politics.

Analogously, both clusterings, $X_1^c$ and $X_2^c$ may contain a cluster about, for example, politics. However, the data cluster of $X_1^c$ relating to politics may be significantly different from the data cluster of $X_2^c$ relating to politics. Again, the goal of embodiments of the present technology is to make these politics cluster closer to each other.

For example, and referring to FIGS. 1, 2 and 3, suppose that a cluster (for example, node $X_1^c$) of cluster group 110A of a first plurality of cluster groups 108 contains a cluster that has data relating to politics; more particularly, President Obama, President Bush, and Sarah Palin. However, a cluster group 110B of the first plurality of cluster groups 108 contains a cluster (for example, node $X_2^c$) that has data relating to not only President Obama, President Bush and Sarah Palin, but also to football. Embodiments of the present technology adjust cluster group 110B to be in higher agreement with cluster group 110A. For example, the data relating to football may be moved to a cluster within that same cluster group 110B that contains data relating to sports.

As described herein, at least one of the objectives of embodiments of the present technology is to have cluster groups within a plurality of cluster groups look similar to each other. This means that if there is a cluster of data in a first cluster group containing data relating to politics, then it is desirable to have a cluster of data in a second cluster group also contain about or the same data relating to politics. Similarly, it is desirable to have a cluster of data in a third cluster group contain about or the same data relating to politics. Additionally, it is desirable to have all of the clusters containing political data within cluster groups of a plurality of cluster groups to be as similar as possible in content. Embodiments of the present technology condition each cluster group of a plurality of cluster groups to be similar to each other.

As shown, the process described herein with regards to adjusting cluster groups of the first plurality of cluster groups 108 to be in higher agreement between themselves occurs in parallel. For example, while embodiments are adjusting cluster group 110A to arrive at a cleaner cluster containing politics, embodiments are also adjusting cluster group 110B to arrive at a cleaner cluster containing sports.

While two cluster groups 110A and 110B are described as being manipulated to become more similar, it is understood that more than two cluster groups may be manipulated at the same time.

Embodiments of the present technology therefore enable cluster groups to become more similar to each other, thereby providing a more stable system. The quality and accuracy of the final stable clustering 220 resulting from applying a clustering algorithm to cluster groups that are similar to each other, is thus improved.

FIG. 4 is a flowchart of an example method for clustering data, in accordance with embodiments of the present technology. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by DCHM 100 of FIG. 1.

Referring to 410 of FIG. 4, in one embodiment and as described herein, the DCHM 100 accesses a first plurality of cluster groups 108 comprising data.

Referring to 415 of FIG. 4, in one embodiment and as described herein, the DCHM 100 applies a clustering method to the first plurality of cluster groups 108 while adjusting the first plurality of cluster groups 108 to be in higher agreement between themselves, thereby generating a second plurality of cluster groups 123 that is in higher agreement between themselves than said first plurality of cluster groups 108. In one embodiment, "conditioning" the first plurality of cluster groups 108 to be similar to each other comprises applying a clustering method to each of the first plurality of cluster groups 108 while adjusting each cluster group of the first plurality of cluster groups 108 to be in higher agreement between themselves.

Referring now to 430 of FIG. 4, in one embodiment and as described herein, the DCHM 100 repeats the applying of a clustering method to each cluster group of the first plurality of cluster groups 108 while adjusting the first plurality of cluster groups 108 to be in higher agreement between themselves until each cluster group of the second plurality of cluster groups 123 are in higher agreement with each other, such that a pre-determined threshold is reached or overcome.

Referring now to 405 of FIG. 4, in one embodiment and as described herein, the DCHM 100 applies a plurality of clustering methods to a set of data 210 to generate the first plurality of cluster groups 108. Referring now to 420 of FIG. 4, in one embodiment and as described herein, the DCHM 100 applies a consensus clustering mechanism 215 to the second plurality of cluster groups 123, thereby generating a stable clustering 220. In one embodiment, the consensus clustering mechanism 215 averages the second plurality of cluster groups, as is seen in 425 of FIG. 4.

Thus, embodiments of the present technology enable a method for performing more stable and accurate data clustering.

Example Computer System Environment

Figure 5:
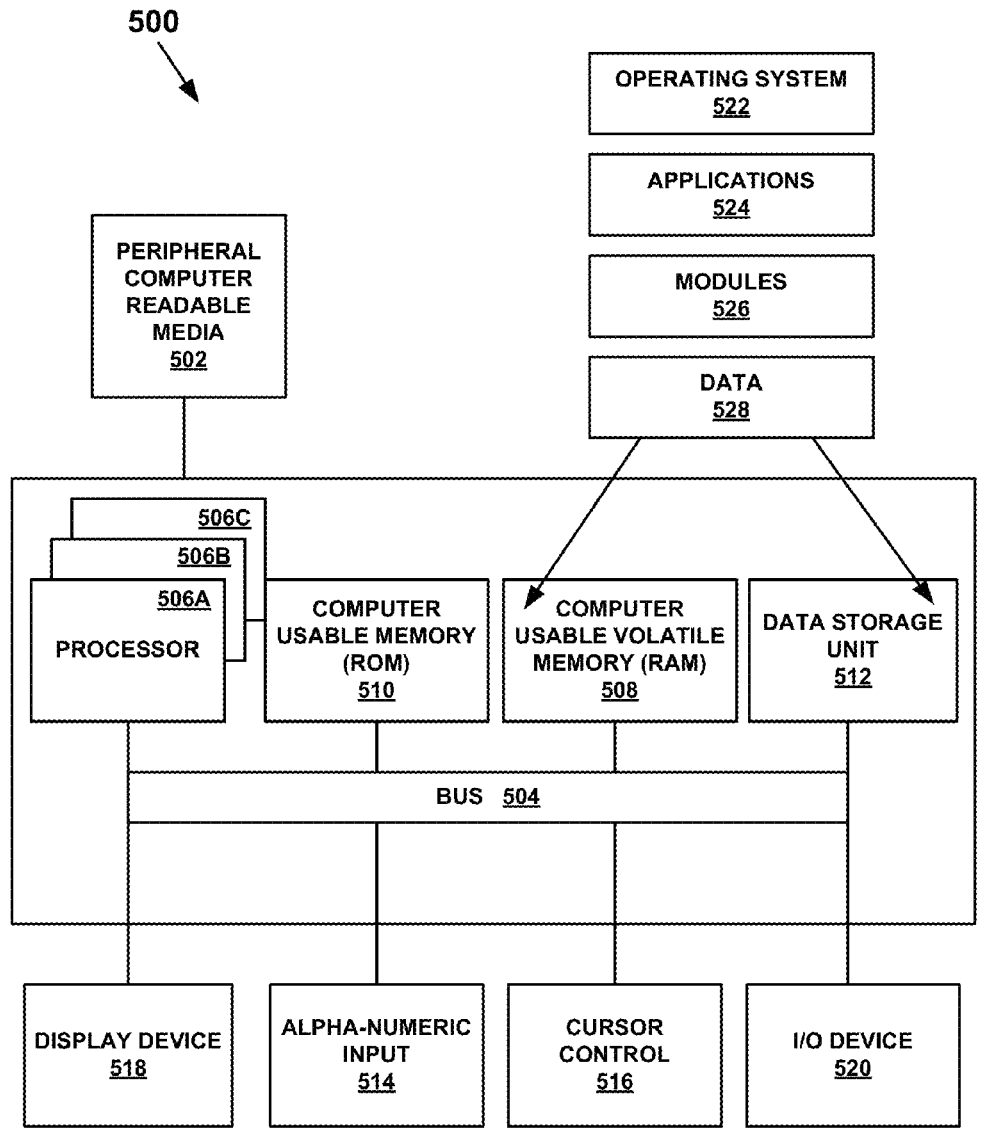
FIG. 5 is a diagram of an example computer system enabling clustering data, in accordance with embodiments of the present technology.

FIG. 5 illustrates an example computer system 500 used in accordance with embodiments of the present technology. It is appreciated that system 500 of FIG. 5 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 5, computer system 500 of FIG. 5 is well adapted to having peripheral computer readable media 502 such as, for example, a compact disc, and the like coupled therewith.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present invention, for example, is stored as an application 524 or module 526 in memory locations within RAM 508 and memory areas within data storage unit 512.

Computing system 500 is only one example of a suitable computing environment and is not intended to suggest any limitation as to the scope of use or functionality of embodiments of the present technology. Neither should the computing environment 500 be interpreted as having any dependency or requirement relating to any one or combination of components illustrated in the example computing system 500.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for clustering data, said method comprising:
   accessing by a computer a first plurality of cluster groups comprising data;
   applying by said computer a clustering method to said first plurality of cluster groups while adjusting by said computer said first plurality of cluster groups to be in higher agreement between themselves, thereby generating a second plurality of cluster groups that is in higher agreement, based on a predetermined threshold, between themselves than said first plurality of cluster groups; said second plurality of cluster groups corresponding to said first plurality of cluster groups, each cluster group of said corresponding thereto, such that said cluster groups of said first plurality correspond to said cluster groups of said second plurality on a one-to-one basis; and
   applying, by said computer, a consensus clustering mechanism to said second plurality of cluster groups, thereby generating a single stable clustering from said second plurality of cluster groups, wherein said single stable clustering generated from said second plurality of cluster groups is stable in that application of said single stable clustering to two different values of an input parameter generates results that are close to one another within a threshold.

2. The method of claim 1, further comprising:
   fixing a value for said second plurality of cluster groups; and
   repeating by said computer said applying and said adjusting until said second plurality of cluster groups are in higher agreement between themselves.

3. The method of claim 1, further comprising:
   before said accessing, applying by said computer a plurality of clustering methods to a set of data to generate said first plurality of cluster groups, wherein said plurality of clustering methods applied to said set of data includes at least one of spectral clustering, partitional clustering, maximum margin clustering, or information-theoretic clustering.

4. The method of claim 1, wherein said adjusting by said computer said first plurality of cluster groups to be in higher agreement between themselves occurs sequentially.

5. The method of claim 1, wherein said adjusting by said computer said first plurality of cluster groups to be in higher agreement between themselves occurs in parallel.

6. A computer system coupled with a data clustering hardware module, said data clustering hardware module comprising:
   a cluster group accessor configured for accessing a first plurality of cluster groups comprising data;
   a cluster group optimizer configured for applying a clustering method to said first plurality of cluster groups and adjusting said first plurality of cluster groups to be in higher agreement between themselves;
   a cluster group generator configured for generating a second plurality of cluster groups that are in higher agreement, based on a predetermined threshold, between themselves than said first plurality of cluster groups, said second plurality of cluster groups corresponding to said first plurality of cluster groups, each second cluster corresponding to just one first cluster, each first cluster having just one second cluster corresponding thereto, such that said second clusters correspond to said first clusters on a one-to-one basis; and a consensus clustering mechanism to generate a single stable clustering from said second plurality of cluster groups, wherein said single stable clustering generated from said second plurality of cluster groups is stable in that application of said single stable clustering to two different values of an input parameter generates results that are close to one another within a threshold.

7. The computer system coupled with a data clustering hardware module of claim 6, further comprising:
 a clustering method applicator configured for applying a plurality of clustering methods to a set of data to generate said first plurality of cluster groups before said accessing said first plurality of cluster groups comprising data.

8. The computer system coupled with a data clustering hardware module of claim 6, further comprising:
 a consensus clustering mechanism configured for applying a consensus clustering method to said second plurality of cluster groups, thereby generating a stable clustering.

9. The computer system coupled with a data clustering hardware module of claim 6, further comprising:
 a sequential optimizer configured for said applying and said adjusting related clusters from different cluster groups of said first plurality of cluster groups one related cluster at a time.

10. The computer system coupled with a data clustering hardware module of claim 6, further comprising:
 a parallelization optimizer configured for said applying and said adjusting related clusters from different cluster groups of said first plurality of cluster groups more than one related cluster at a time.

11. A non-transitory computer usable storage medium comprising instructions that when executed cause a computer system to perform a method for clustering data, said method comprising:
 accessing a first plurality of cluster groups comprising data;
 conditioning each cluster group of said first plurality of cluster groups to be similar to each other, thereby generating a second plurality of cluster groups that is in higher agreement, based on a predetermined threshold, between themselves than said first plurality of cluster groups; said second plurality of cluster groups corresponding to said first plurality of cluster groups, each cluster group of said second plurality corresponding to just one cluster group of said first plurality, each cluster group of said first plurality having just one cluster group of said second plurality corresponding thereto, such that said cluster groups of said first plurality correspond to said cluster groups of said second plurality on a one-to-one basis; and
 applying a consensus clustering mechanism to said second plurality of cluster groups, thereby generating a single stable clustering from said second plurality of cluster groups, wherein, after said conditioning, wherein said single stable clustering generated from said second plurality of cluster groups is stable in that application of said single stable clustering to two different values of an input parameter generates results that are close to one another within a threshold.

12. The non-transitory computer usable storage medium of claim 11, wherein said conditioning comprises:
 applying a clustering method to said first plurality of cluster groups while adjusting said first plurality of cluster groups to be in higher agreement between themselves, thereby generating said second plurality of cluster groups that is in higher agreement between themselves than said first plurality of cluster groups.

13. The non-transitory computer usable storage medium of claim 11, further comprising:
 fixing a value for said second plurality of cluster groups; and
 repeating said conditioning until said second plurality of cluster groups are in higher agreement between themselves.

14. The non-transitory computer usable storage medium of claim 13, further comprising:
 before said accessing, applying a plurality of clustering methods to a set of data to generate said first plurality of cluster groups.

15. The non-transitory computer usable storage medium of claim 11, wherein conditioning by said computer said first plurality of cluster groups to be in higher agreement between themselves occurs sequentially.

16. The non-transitory computer usable storage medium of claim 11, wherein said conditioning by said computer said first plurality of cluster groups to be in higher agreement between themselves occurs in parallel.

\* \* \* \* \*

UNITED STATES PATENT AND TRADEMARK OFFICE
CERTIFICATE OF CORRECTION

| | | |
|---|---|---|
| PATENT NO. | : 8,463,784 B1 | Page 1 of 1 |
| APPLICATION NO. | : 12/537614 | |
| DATED | : June 11, 2013 | |
| INVENTOR(S) | : Ron Bekkerman et al. | |

It is certified that error appears in the above-identified patent and that said Letters Patent is hereby corrected as shown below:

In the Claims:

In column 10, line 22, in Claim 1, after "of said" insert -- second plurality corresponding to just one cluster group of said first plurality, each cluster group of said first plurality having just one cluster group of said second plurality --.

Signed and Sealed this
Tenth Day of September, 2013

Teresa Stanek Rea
*Acting Director of the United States Patent and Trademark Office*